July 3, 1945.  P. P. SAUNIER, JR  2,379,496
ALTIMETER
Filed April 6, 1942  2 Sheets-Sheet 1
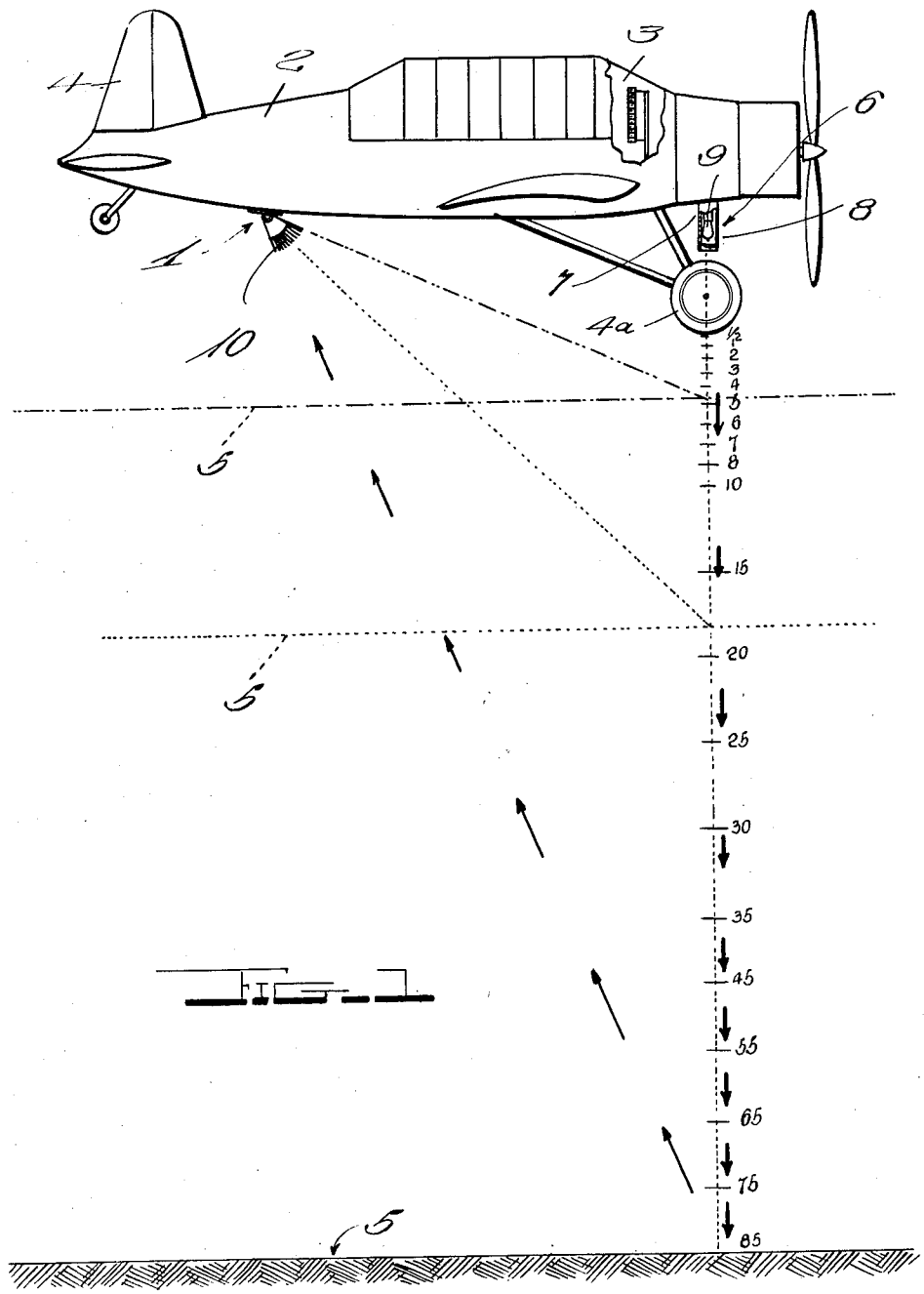
INVENTOR.
PIERRE PAUL SAUNIER, JR.
BY Lacey & Lacey,
ATTORNEYS July 3, 1945.   P. P. SAUNIER, JR   2,379,496
ALTIMETER
Filed April 6, 1942   2 Sheets-Sheet 2
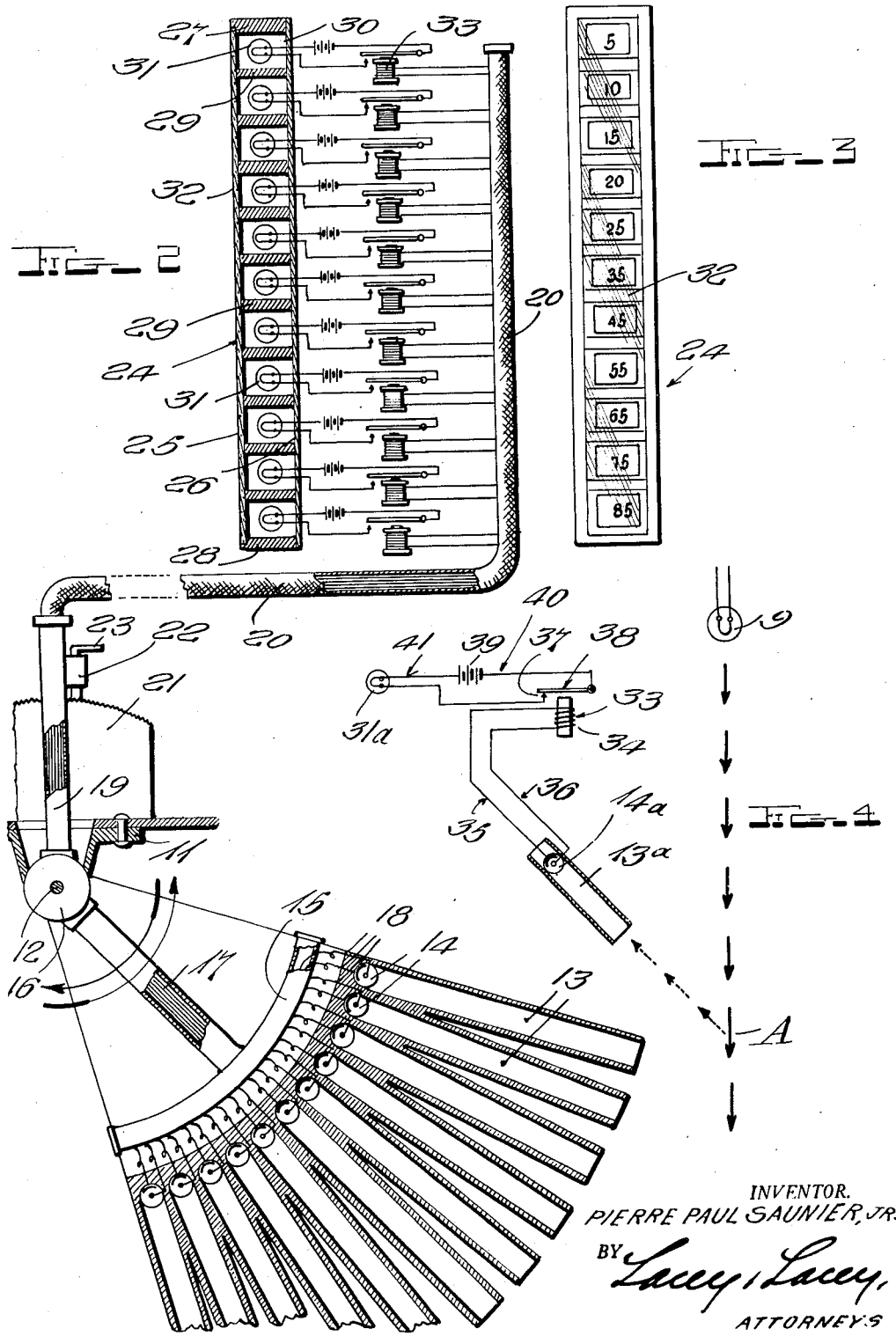
INVENTOR.
PIERRE PAUL SAUNIER, JR.
BY Lacey & Lacey
ATTORNEYS Patented July 3, 1945

2,379,496

UNITED STATES PATENT OFFICE 2,379,496

ALTIMETER

Pierre Paul Saunier, Jr., Henrico County, Va.

Application April 6, 1942, Serial No. 437,893

3 Claims. (Cl. 88—1)

This invention relates generally to height indicating devices and more particularly to an improved altimeter for accurately indicating the actual height of an aircraft above the ground or other surface, particularly when it is desired to land the aircraft at night.

As is well known, altimeters as constructed up to the present time depend either upon barometric pressure or upon the reflection of radio beams for their proper operation. Altimeters depending upon barometric pressure for their operation are only effective for indicating the height of the aircraft above sea level. The radio beam type of altimeter is more accurate in that it indicates the height of the airplane from the surface regardless of sea level. However, neither of the types mentioned are effective for indicating the exact altitude of an airplane when the same is just a few feet above the ground.

One of the principal objects of the invention is, therefore, to provide an altimeter which will be operative for indicating to the pilot the exact altitude of an airplane as the craft approches the ground.

Another object of the invention is to provide an altimeter wherein means is employed for enabling the pilot to ascertain the height of his ship above the ground and to keep a continual check on the height as the plane approaches within a few feet of the ground so that he will be enabled to effect a good landing even though visibility is poor.

Another object of the invention is to provide a device of this character which is simple in construction and practically fool-proof in operation.

Another object of the invention is to provide an altimeter wherein the photo-electric cell unit employed is adjustably mounted so that the device may be caused to respond for indicating different ranges of altitude.

Further objects of the invention, not mentioned hereinbefore, will become apparent during the course of the following description.

In the drawings forming a part of my application:

Figure 1 is a schematic view showing the arrangement of my improved altimeter on an airplane and showing the manner of operation of the device as the craft approaches the ground, Figure 2 is an enlarged detail sectional view of the photo-electric cell unit, the indicator being shown in section and the wiring to the indicator being shown diagrammatically, Figure 3 is a front elevation of the indicator, and Figure 4 is a diagrammatic view of the circuit arrangement between one of the photo-electric cells and its associated relay and indicator lamp.

In Figure 1 of the drawings, the numeral 1 indicates in general an airplane. The airplane 1 includes a fuselage 2 and a cockpit 3, said fuselage, of course, including a tail assembly or empennage 4 and the landing gear 4ª. The airplane 1 is shown approaching the ground 5 in preparation for a landing.

Mounted near the forward end of the fuselage 2, below the cockpit and between the wheels 4ª of the landing gear, is a light beam projector 6. The light beam projector preferably should be mounted near the landing gear as it is, of course, the landing gear that makes the first contact with the ground. The light beam projector includes a casing 7, which depends vertically from the fuselage, and contains a lens 8. Mounted in the casing is a lamp 9 which is connected to a source of electric current so that, when energized, a beam of light will be projected through the lens 8 and downwardly to the ground 5. It is to be noted that the beam of light is slender and intense and is restricted generally to the vertical and, thus will project at right angles to the fuselage. It is desired to emphasize that a slender, intense beam will be used so that readings of maximum accuracy will be assured. As a matter of fact, the accuracy of the instrument will be proportional to the intensity and slenderness of the beam. If invisible beams are necessary, in the interest of strategy or for any other reason, infra-red or ultra-violet rays may be projected from the projector 6. The use of such rays would, of course, prevent detection by an enemy when the airplane was being operated under war conditions.

It is desired to state that the invention is particularly adapted for use as a landing altimeter. For that reason, the principle of triangulation upon which the invention operates means that the distance from the light source to the point of reflection is that which is actually measured. Therefore, the source of light should be placed as close as possible to the landing gear, at a point in or near the fuselage and approximately vertically above the axles of the wheels when the ship is in some position between gliding and landing, whichever is found most satisfactory, so that the beam may project downwardly between the wheels. Thus, the instrument will always indicate the distance the point of origin of the beam is from the point of reflection, i. e., the ground. If the bottoms of the wheels are four feet from the point of origin of the beam and approximately below it, then the dial should be calibrated to allow for the four feet.

If the light source is mounted in the fuselage, as shown, the change in position of the aircraft from the gliding to the landing position, producing a change in the horizontal relationship to the light source and the lowermost portion of the wheels, will result in a slightly inaccurate reading. This error would be eliminated if the source of light were mounted on the wheel axle. Accordingly, if desired, the light source may be so mounted.

It should be understood that, if found desirable, the light beam may be projected at a slight angle from the vertical and not on the vertical.

Mounted on the fuselage 2 near the tail assembly 4 and in the same vertical plane with the light beam projector is a photo-electric cell unit 10. The unit 10 is hingedly mounted to the fuselage by means of a bracket 11, said bracket being connected with the unit proper by a hinge bolt 12. The photo-electric cell unit, as best seen in Figures 1 and 2, is of substantially fan shape and includes a plurality of radiating director tubes 13 which are open at their outer ends. In actual practice it is desired to point out that the unit 10 will preferably be formed as a single casting. Mounted in each of the tubes is a photo-electric cell 14 and mounted on the unit inwardly of the inner ends of the tubes 13 is an arcuate distributor pipe 15 and this pipe is connected to the hinge member, indicated at 16, by a hollow radial pipe 17. The pipes 15 and 17 receive pairs of wires 18, each pair of said wires being connected with one of the photo-electric cells 14 and said wires extending through the pipes 15 and 17, through the hinge joint 16 and through a guide pipe 19 which extends upwardly into the fuselage. The pairs of wires 18 are formed into a cable 20 which extends into the cockpit 3 for cooperation with the indicator, to be described in more detail hereinafter.

The radiating tubes 13 are arranged so that they will have a definite angle of relationship to each other and to the beam of light to be projected from the light beam projector 6. That is to say, the angles of the radiating tubes with respect to the horizontal axis of the fuselage and to the vertical beam of light will be calculated so that the points at which the beam from the projectors will intersect the paths of the photo-electric cells will be a known distance beneath the fuselage. These known distances will be calculated in feet and will appear upon the indicator to be described hereinafter.

It should be understood that the light beam will be so arranged that, at a high altitude, the photo-electric cell setting to record such altitude will register that height over quite a range of altitude, in view of the area of coverage at such high altitude. Therefore, it should be understood that the area covered by each tube at various altitudes, and the areas covered by the source of light will be arranged and correlated in such a manner that at least one photo-electric cell will always react, within the range of altitude the instrument is used for, and that some overlapping of the areas which the tubes cover will take place for preventing the occurrence of "no indication" on the dial, when the plane is hovering at an altitude between two adjacent photo-electric tubes. The sensitivity of the cells may be varied so that the operator or pilot can eliminate all except the strongest beam.

It is desired particularly to point out that, although I disclose the photo-electric cell unit 10 as being of fan shape, it is obvious that a plurality of separate photo-electric cell tubes may be mounted at various points along the fuselage and at desired angles with respect thereto.

In order to permit adjustment of the unit 10 on the bracket 11, to cause the photo-electric cells to function selectively at various different heights, I provide a toothed sector 21 which is mounted on the floor of the fuselage adjacent the guide pipe 19. As will be observed, the pipe 19 is provided with a laterally extending bracket 22, and mounted in the bracket is a plunger 23 having a toothed lower end for engagement with the teeth of the sector 21. The guide pipe 19 may be swung to various adjusted positions and will be held in an adjusted position by the engagement of the toothed plunger with the sector.

In the cockpit 3 there is mounted an indicator for indicating to the pilot the exact height of his ship. The indicator is shown generally at 24 and is of oblong rectangular shape. In this connection it should be understood that the indicator may be of circular or any other desired shape. The indicator 24 includes side walls 25 and 26 and top and bottom walls 27 and 28. Mounted in the indicator is a plurality of partitions 29 which define compartments 30. Mounted in each of the compartments is a bulb 31. Normally closing the front of the indicator is a translucent front wall 32. As will be seen in Figure 3, the front wall is laid off in squares and each of said squares is adapted to overlie one of the compartments 29 and is, in addition, provided with indicia for indicating height in feet of the aircraft above the surface on which it is to land. The squares may be colored as, for example, the square confronting the bulb which is energized when the airplane is within five feet of the ground could be colored red.

In Figure 4 I have shown diagrammatically the connection between one of the photo-electric cells 14, in its associated tube 13, and its control relay, one of the indicator bulbs 31 and the current source for illuminating said bulb upon energization of the relay. More specifically, the numeral 13a indicates a tube of the unit 10 and the numeral 14ª a photo-electric cell in the tube. At 33 is shown generally a relay of the ultra-sensitive type and said relay includes a coil 34 which is connected to the photo-electric cell 14ª by conductors 35 and 36. At 31ª is shown one of indicator bulbs and this bulb has one of its terminals connected with a contact 37 of the relay 33. The armature 38 of the relay is connected with one terminal of the battery 39 by a conductor 40. The other terminal of the battery 39 is connected to the terminal 31ª by a conductor 41. As shown by the arrows, beams from the bulb 9 will project downwardly to the ground or other surface and will intersect the path of the photo-electric cell 14ª at a point which will be designated at A. The path of the photo-electric cell will be restricted to that shown by the oblique arrows so that operation of the photo-electric cell would not take place until the plane approaches the earth to the extent that it is no longer possible for the path of the photo-electric cell to intersect the light beams at the point A. As soon as the plane approaches the ground to the extent that the ground will cut off the beams above the point A, the path to the photo-electric cell 14ª will be broken and the relay will be energized for attracting the armature 36 to the contact 37 for closing the circuit through the battery 39 to the bulb 31a. The bulb will, as stated, be disposed behind one of the squares of the front wall 32 and the indicia on said square will indicate the height of the plane above the ground at the point of intersection of the light beam and the path of the photo-electric cell with the ground.

As best seen in Figures 1 and 2, the tubes 13 of the unit 10 are directed toward the beam from the projector 6 and are disposed in such a manner that the path of the photo-electric cells will intersect the light beam at predetermined distances beneath the fuselage of the airplane. The wall 32 of the indicator 24 is, as stated, provided with squares having indicia. The indicia is in the form of a number or numbers indicating feet. More specifically, the number 85 is placed on a square of the wall 32 which covers the compartment containing the bulb which is energizable when the airplane is eighty-five feet above the ground. The other squares are correspondingly numbered and cover compartments containing bulbs which are connected with photo-electric cells whose paths intersect the light beam at predetermined distances beneath the airplane. It will thus be seen that, as an airplane equipped with my altimeter approaches the ground, the altimeter will come into operation when the plane reaches a height of, for example, eighty-five feet above the ground by the action of the photoelectric cell in the lowermost of the tubes 13. As the plane approaches the ground, the remaining photo-electric cells will be progressively energized for energizing their associated relays and thus illuminating, progressively, the bulbs in the compartments in the indicator 24. The pilot will thus be enabled to keep an accurate check on the height of his ship from the time it reaches a predetermined height above the ground until it actually comes into a position permitting a safe smooth landing.

In view of the fact that the photo-electric cell unit 10 is adjustably mounted, it will be possible to adjust the device to respond within different ranges of altitude.

Attention is directed to the fact that, although I have shown the photo-electric cells mounted exteriorly of the fuselage, they can be mounted inside the fuselage and that portion of said fuselage which is disposed beneath said cells can be made transparent. Thus, the cells would be securely mounted in position and would not interfere with the streamlining of the fuselage. It is obvious that, if desired, other methods of mounting the photo-electric cells may be employed.

It is also directed particularly to emphasize that the efficiency of my improved altimeter increases as the plane approaches the ground. Accordingly, maximum accuracy of indication is assured.

It is believed that from the foregoing description, it will be seen that I have provided an altimeter which is of relatively simple construction and by the use of which it will be possible for a pilot to keep an accurate check on the height of his ship when approaching the ground so that danger of accidents due to faulty landings, particularly at night, will be reduced to a minimum.

Having thus described the invention, what is claimed as new is:

1. An altimeter including, in combination with an aircraft, a light beam projector mounted on the aircraft in position for projecting light beams towards the surface of the earth in a plane perpendicular thereto, indicating means in the aircraft including a casing extending vertically and partitioned to form a plurality of compartments disposed one above another and open at the front of the casing, a bulb in each compartment, and a wall of light penetratable material at the front of the casing closing the compartments and having indicia thereon relating to height, a photo-electric cell unit mounted on the aircraft in spaced relation to the light beam projector longitudinally of the aircraft and including a mounting member pivotally mounted for vertical swinging adjustment and a plurality of director tubes arranged thereon in an arcuate path and extending radially therefrom, a photo-electric cell in each of said tubes, and circuits operatively connecting each of said cells with a companion one of said bulbs of the indicating means, there being a relay in each circuit, said director tubes disposing the paths of the photo-electric cells in predetermined diagonally extending planes to intersect the light beams from the light beam projector at predetermined distances beneath the aircraft, and said photo-electric cells being energizable upon interruption of the light beams at points above the intersection of said light beams and said paths by the surface of the earth whereby an accurate and continuous check may be kept on the altitude of the aircraft above the surface of the earth as said aircraft approaches said surface.

2. An altimeter including, in combination with an aircraft, a light beam projector mounted on the aircraft in position for projecting a light beam toward the surface of the earth, indicating means in the aircraft including a casing partitioned to form a plurality of compartments each open at its front, a bulb in each compartment, and a wall of light-penetratable material closing the compartments and bearing indicia relating to height, a photo-electric cell unit mounted on said aircraft in spaced relation to the light beam projector and including a mounting pivotally mounted for vertical swinging adjustment and a plurality of director tubes arranged thereon in an arcuate path and extending radially thereof, a photo-electric cell in each tube, and circuits operatively connecting each of said cells with a companion one of the bulbs of said indicating means, there being a relay in each circuit, said director tubes disposing the paths of the photo-electric cells in predetermined diagonally extending planes to intersect the light beam from the light beam projector at predetermined distances beneath the aircraft, and said photo-electric cells being energizable upon the reflection of the light beam by the surface of the earth at the points of intersection of said light beam and said paths, whereby an accurate and continuous check may be kept on the height of the aircraft above the surface of the earth as said aircraft approaches said surface.

3. An altimeter including, in combination with an aircraft, a light beam projector mounted on the aircraft in position for projecting a light beam towards the surface of the earth, indicating means in the aircraft including a casing partitioned to form a plurality of compartments, each bearing indicia relating to height, a bulb in each compartment for illuminating each indicia, a plurality of director tubes adjustably mounted on said aircraft, each in spaced relation to the light beam projector and in angular relation to the light beam from said projector, a photoelectric cell in each tube, circuits operatively connecting each of said cells with a companion bulb of said indicating means, said director tubes disposing the paths of the photoelectric cells in diagonally extending planes to intersect the light beam from the light beam projector at predetermined distances beneath the aircraft, and said photoelectric cells being energizable upon the reflection of the light beam by the surface of the earth at the points of intersection of said light beam and said paths whereby an accurate and continuous check may be kept on the height of the aircraft above the surface of the earth as the aircraft approaches said surface.

PIERRE PAUL SAUNIER, JR.